United States Patent
Mital et al.

(10) Patent No.: US 11,848,462 B2
(45) Date of Patent: Dec. 19, 2023

(54) BATTERY OUTGASSING FILTER SYSTEM AND METHOD TO FILTER OUTGASSING FROM A BATTERY CELL

(71) Applicant: GM GLOBAL TECHNOLOGY OPERATIONS LLC, Detroit, MI (US)

(72) Inventors: Rahul Mital, Rochester Hills, MI (US); Bryan D. Axe, Farmington Hills, MI (US)

(73) Assignee: GM Global Technology Operations LLC, Detroit, MI (US)

(*) Notice: Subject to any disclaimer, the term of this patent is extended or adjusted under 35 U.S.C. 154(b) by 83 days.

(21) Appl. No.: 17/186,589

(22) Filed: Feb. 26, 2021

(65) Prior Publication Data
US 2022/0278418 A1    Sep. 1, 2022

(51) Int. Cl.
*H01M 50/30* (2021.01)
*H01M 50/358* (2021.01)
*H01M 50/367* (2021.01)
*H01M 50/383* (2021.01)
*H01M 50/392* (2021.01)

(52) U.S. Cl.
CPC ....... *H01M 50/394* (2021.01); *H01M 50/358* (2021.01); *H01M 50/367* (2021.01); *H01M 50/392* (2021.01); *H01M 50/383* (2021.01)

(58) Field of Classification Search
CPC ............. H01M 50/367; H01M 50/358; H01M 50/394; H01M 50/35; H01M 50/392; H01M 50/39; H01M 50/383
See application file for complete search history.

(56) References Cited

U.S. PATENT DOCUMENTS

| | | | | |
|---|---|---|---|---|
| 5,843,593 A | * | 12/1998 | Fritts ................... | H01M 50/394 429/84 |
| 2002/0094473 A1 | * | 7/2002 | Lin ...................... | H01M 50/394 429/86 |
| 2013/0115533 A1 | * | 5/2013 | Friesen ................ | H01M 50/30 429/409 |
| 2015/0072184 A1 | * | 3/2015 | Kusunoki ........... | H01M 50/317 429/54 |
| 2015/0372268 A1 | * | 12/2015 | Ichikawa ............ | H01M 50/209 429/87 |
| 2016/0233471 A1 | * | 8/2016 | Khandelwal ........ | H01M 50/224 |
| 2019/0006650 A1 | * | 1/2019 | Bryla .................. | H01M 50/367 |
| 2020/0091484 A1 | * | 3/2020 | Guen .................. | H01M 50/394 |
| 2020/0112009 A1 | * | 4/2020 | Riley .................... | H01M 50/24 |
| 2020/0280030 A1 | * | 9/2020 | Waha .................... | H01M 50/30 |
| 2021/0151785 A1 | * | 5/2021 | Kurabuchi ........ | H01M 8/04186 |
| 2021/0273252 A1 | * | 9/2021 | Ito ........................ | H01M 8/188 |
| 2022/0069411 A1 | * | 3/2022 | Wakabayashi ...... | H01M 50/227 |

(Continued)

FOREIGN PATENT DOCUMENTS

WO    WO-2021169494 A1 *  9/2021 .......... H01M 10/613

*Primary Examiner* — Imran Akram
(74) *Attorney, Agent, or Firm* — Quinn IP Law

(57) ABSTRACT

A battery outgassing filter system is provided. The system includes a battery cell, an external casing encapsulating the battery cell and including a casing vent, and an outgassing filter disposed upon the casing vent and including a filter element including a first filter element portion operable to contain a first size of particulate matter and a second filter element portion operable to contain a second size of particulate matter relatively smaller than the first size of particulate matter.

13 Claims, 10 Drawing Sheets

(56) References Cited

U.S. PATENT DOCUMENTS

| | | | |
|---|---|---|---|
| 2022/0140432 A1* | 5/2022 | Chen | H01M 10/625 429/53 |
| 2022/0223974 A1* | 7/2022 | Zbiral | H01M 50/394 |

* cited by examiner

BATTERY OUTGASSING FILTER SYSTEM AND METHOD TO FILTER OUTGASSING FROM A BATTERY CELL

INTRODUCTION

The disclosure generally relates to a battery outgassing filter system and a method to filter outgassing from a battery cell.

Electric and hybrid electric vehicles utilize battery devices to store electrical energy. Vehicular batteries such as lithium-ion batteries involve chemical reactions that achieve the goals of storing and selectively providing stored electrical energy. Batteries include an anode, a cathode, and a separator which keeps the anode and cathode apart.

SUMMARY

Batteries may degrade in operation over time and usage. In some instances, if a separator within the battery fails or leaks, an undesirable chemical reaction with excessive heat and release of gases may occur. During such a reaction, an outgassing event may take place in which reactive gases may be expelled from the battery. Additionally, soot and other heated debris may additionally be expelled from the battery. Avoiding the reactive gases and the heated debris from mixing in a presence of oxygen may be advantageous. A battery system may include a parameter that such an outgassing event is to be contained for some minimum time period.

A battery outgassing filter system is provided. The system includes a battery cell, an external casing encapsulating the battery cell and including a casing vent, and an outgassing filter disposed upon the casing vent and including a filter element including a first filter element portion operable to contain a first size of particulate matter and a second filter element portion operable to contain a second size of particulate matter relatively smaller than the first size of particulate matter.

In some embodiments, the first filter element portion includes a first filter mesh, the second filter element portion includes a second filter mesh, and wherein the second filter mesh is finer than the first filter mesh.

In some embodiments, the first filter element portion includes a planar fibrous filter element.

In some embodiments, the first filter element portion includes a foam-based porous filter element.

In some embodiments, the first filter element portion includes a wall flow filter element.

In some embodiments, the first filter element portion includes a partial-filtration bypass gap filtration element.

In some embodiments, the first filter element portion includes a catalyzed filter element.

In some embodiments, the outgassing filter includes a multi-layer filtration element.

In some embodiments, the outgassing filter includes a multi-layer three-dimensional-polygon-shaped filtration element.

According to one alternative embodiment, a battery outgassing filter system is provided. The system includes a battery cell, an external casing encapsulating the battery cell and including a casing vent, and an outgassing filter disposed upon the casing vent and including a filter element. The filter element includes a first filter element portion including a first filter mesh operable to contain a first size of particulate matter. The filter element further includes a second filter element portion receiving a gas flow from the first filter element portion and including a second filter mesh operable to contain a second size of particulate matter relatively smaller than the first size of particulate matter. The second filter mesh is finer than the first filter mesh.

In some embodiments, the first filter element portion includes a planar fibrous filter element.

In some embodiments, the first filter element portion includes a foam-based porous filter element.

In some embodiments, the first filter element portion includes a wall flow filter element.

In some embodiments, the first filter element portion includes a partial-filtration bypass gap filtration element.

In some embodiments, the first filter element portion includes a catalyzed filter element.

In some embodiments, the outgassing filter includes a multi-layer filtration element.

In some embodiments, the outgassing filter includes a multi-layer three-dimensional-polygon-shaped filtration element.

According to one alternative embodiment, a method to filter outgassing from a battery cell is provided. The method includes containing the battery cell within a external casing, wherein gas generated by the battery cell may exit the external casing through a casing vent. The method further includes disposing an outgassing filter to the casing vent, wherein the gas generated by the battery cell and flowing through the casing vent passes through the outgassing filter. The outgassing filter includes a first filter element portion operable to contain a first size of particulate matter and a second filter element portion operable to contain a second size of particulate matter relatively smaller than the first size of particulate matter.

In some embodiments, the method further includes permitting the gas generated by the battery cell to flow through the outgassing filter for some threshold period of time while particulate matter is contained within the outgassing filter.

The above features and advantages and other features and advantages of the present disclosure are readily apparent from the following detailed description of the best modes for carrying out the disclosure when taken in connection with the accompanying drawings.

DETAILED DESCRIPTION

Testing shows that insufficient battery outgassing filter systems are susceptible to becoming clogged or saturated with a first size of particulate matter, such that release of the reactive gas is slowed and pressure may buildup within the battery. Further, as a battery outgassing filter system becomes clogged with a first size of particulate matter, increasing pressure may cause gas velocity within small portions of a filter element of the battery outgassing filter system to increase sharply and force particulate matter through the filter element. Such particulate matter forced through the filter element may emerge from the battery outgassing filter system into an area where the reactive gas from the battery outgassing filter system is mixing with ambient air. Such particulate matter may be heated from chemical reactions within the battery and may act as an ignition source to the reactive gas.

A battery outgassing filter system and method is provided. The battery outgassing filter system is operable to permit a flow of reactive gas therethrough and includes a filter element including a first filter element portion operable to contain a first size of particulate matter and a second filter element portion operable to contain a second size of particulate matter relatively smaller than the first size of particulate matter. By containing the first size of particulate matter and the second size of particulate matter relatively smaller than the first size of particulate matter within the battery outgassing filter system, the flow of reactive gas is vented from the battery outgassing filter system without the a first size of particulate matter and the a second size of particulate matter relatively smaller than the first size of particulate matter acting as an ignition source to the reactive gas.

Figure 1:
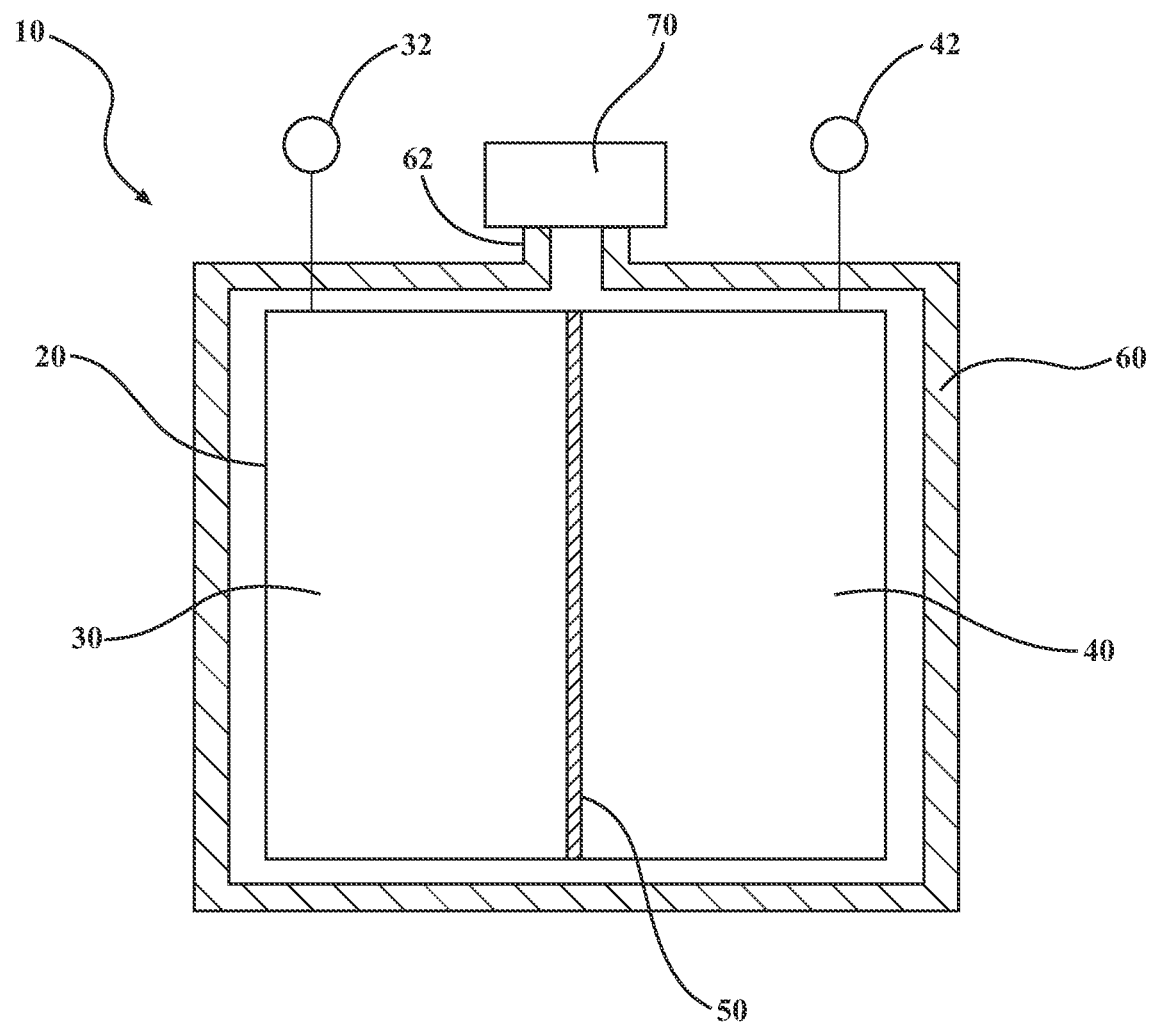
FIG. 1 schematically illustrates an exemplary battery outgassing filter system, in accordance with the present disclosure.

FIG. 1 schematically illustrates an exemplary battery outgassing filter system 10. Battery cell 20 is illustrated, including an anode 30, a cathode 40, and a separator 50. The separator 50 may be constructed various different materials, including polypropylene. The separator 50 acts to provide ion transfer between the anode 30 and the cathode 40 and acts to keep separate the chemicals and materials of the anode 30 from coming into direct contact with the chemicals and materials of the cathode 40. The battery cell 20 further includes a negative terminal 32 electrically connected to the anode 30 and a positive terminal 42 connected to the cathode 40. A battery system may include a plurality of the battery cells 20.

The battery outgassing filter system 10 includes an exterior casing 60 an outgassing filter 70, and a casing vent portion 62 connecting the exterior casing 60 to the outgassing filter 70. Electrical connections between the negative terminal 32 and the anode 30 and between the positive terminal 42 and the cathode 40 are airtight. Gases produced within the exterior casing 60 may exit the exterior casing through the outgassing filter 70.

Degradation or leak paths in the separator 50 may cause chemicals or materials of the anode 30 to contact chemicals or materials of the cathode 40. Such direct contact creates a chemical reaction between the anode 30 and the cathode 40, which typically disables and ends a useful life of the battery cell 20. In addition, the chemical reaction may generate heat and result in generation of reactive gas. In addition, heated soot and high-temperature particulate matter is generated. If the exterior casing 60 were sealed, the generated gas would increase pressure within the exterior casing 60, which may cause a crack to form in the exterior casing 60. By creating a leak path through the outgassing filter 70, controlled outgassing may be achieved.

The outgassing filter 70 includes a filter element including a first filter element portion operable to contain a first size of particulate matter and a second filter element portion operable to contain a second size of particulate matter relatively smaller than the first size of particulate matter.

Figure 2:
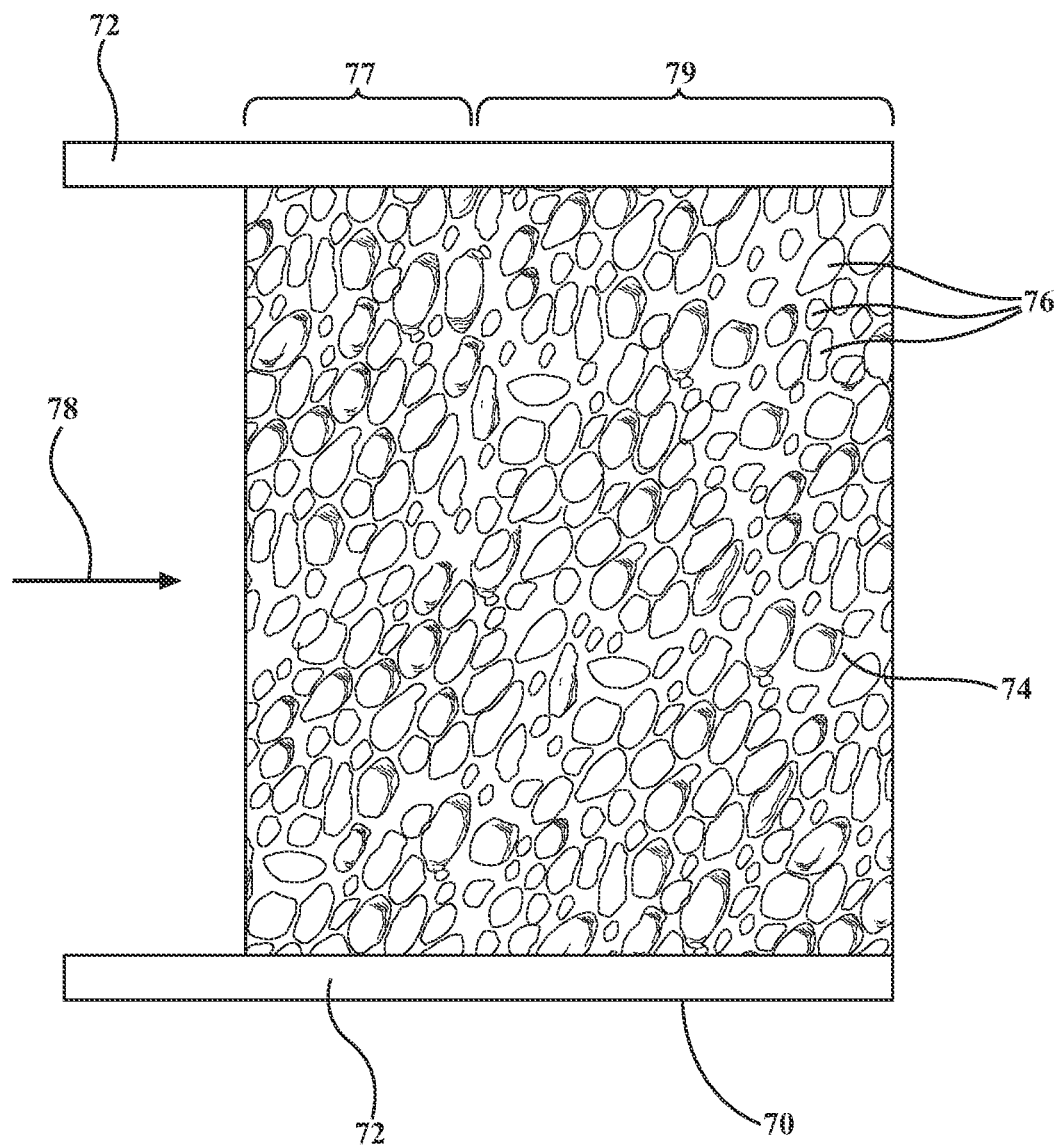
FIG. 2 schematically illustrates an exemplary battery filter device including a foam-based porous filtration element, accordance with the present disclosure.

FIG. 2 schematically illustrates the outgassing filter 70 including a foam-based porous filtration element 74. The outgassing filter 70 is illustrated including an outgassing filter outer wall 72 and the foam-based porous filtration element 74. A gas flow 78 resulting from battery outgassing is illustrated. The foam-based porous filtration element 74 includes internal cavities 76 which enable a gas to flow through the foam-based porous filtration element 74. The foam-based porous filtration element 74 may provide a three-dimensional flow path for the gas flow 78 to traverse through. As the gas flows through the tortuous, three-dimensional flow path, particles in the gas get stuck to the walls and are thus filtered from the gas flow 78.

The foam-based porous filtration element 74 may include a first portion 77 which may include relatively larger cavities 76 which enables the first portion 77 to filter and prevent flow therethrough of larger or a first size of particulate matter. The foam-based porous filtration element 74 may further include a second portion 79. The second portion 79 may be formed integrally with or may be a separate slab of material from the first portion 77. The second portion 79 may include relatively smaller cavities 76 as compared to the cavities 76 of the first portion 77. In another embodiment, the foam-based porous filtration element 74 may operate unitarily as a first portion operable to contain a first size of particulate matter, and a separate, second filtration element may be used in addition to the foam-based porous filtration element 74, wherein the second filtration element may be operable to contain a second size of particulate matter relatively smaller than the first size of particulate matter that passes through the foam-based porous filtration element 74.

Figure 3:
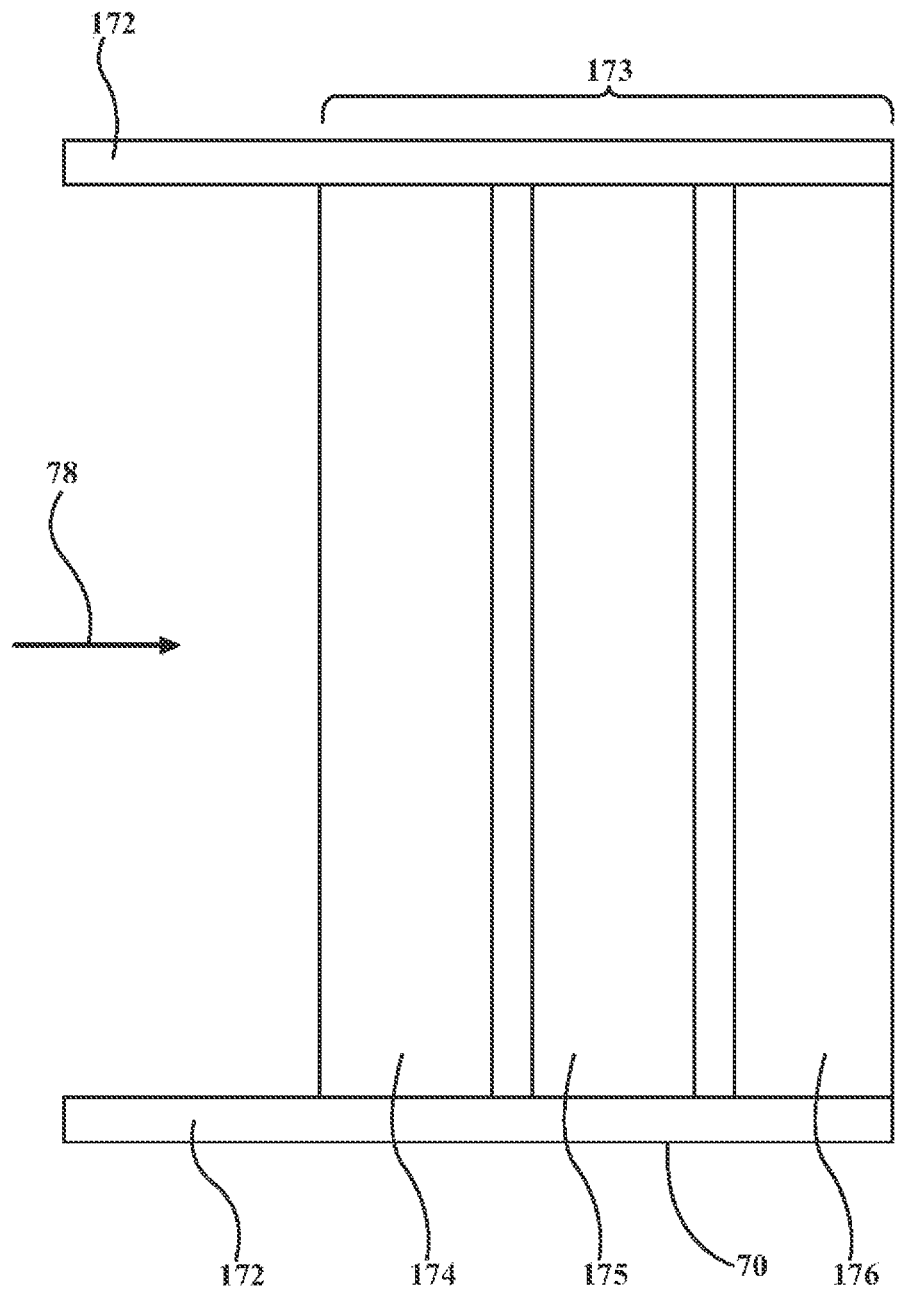
FIG. 3 schematically illustrates an exemplary battery filter device including a multi-layer, graduating filtration from course-to-fine filtration element, in accordance with the present disclosure.

FIG. 3 schematically illustrates the outgassing filter 70 including an alternative exemplary multi-layer filtration element 173. The multi-layer filtration element 173 is encased within an outgassing filter outer wall 172 and includes graduating filtration, with a first layer 174 including a course mesh filtration, with a third layer 176 including a fine mesh filtration, and with a second layer 175 including an intermediate mesh filtration. The three layers include gradually finer and finer filter mesh. The gas flow 78 is illustrated. Each of the first layer 174, the second layer 175, and the third layer 176 may be a same type of filter, for example, a flat/planar fibrous mesh filter, a foam-based porous filter element such as the foam-based porous filtration element 74 of FIG. 2 or a wall flow filter element. In another embodiment, the multi-layer filtration element 173 may include different types of filter elements in the different layers. The first layer 174 may be operable to contain a first size of particulate matter and the third layer 176 may be operable to contain a second size of particulate matter relatively smaller than the first size of particulate matter. Various numbers of layers may be utilized within the outgassing filter 70.

Figure 4:
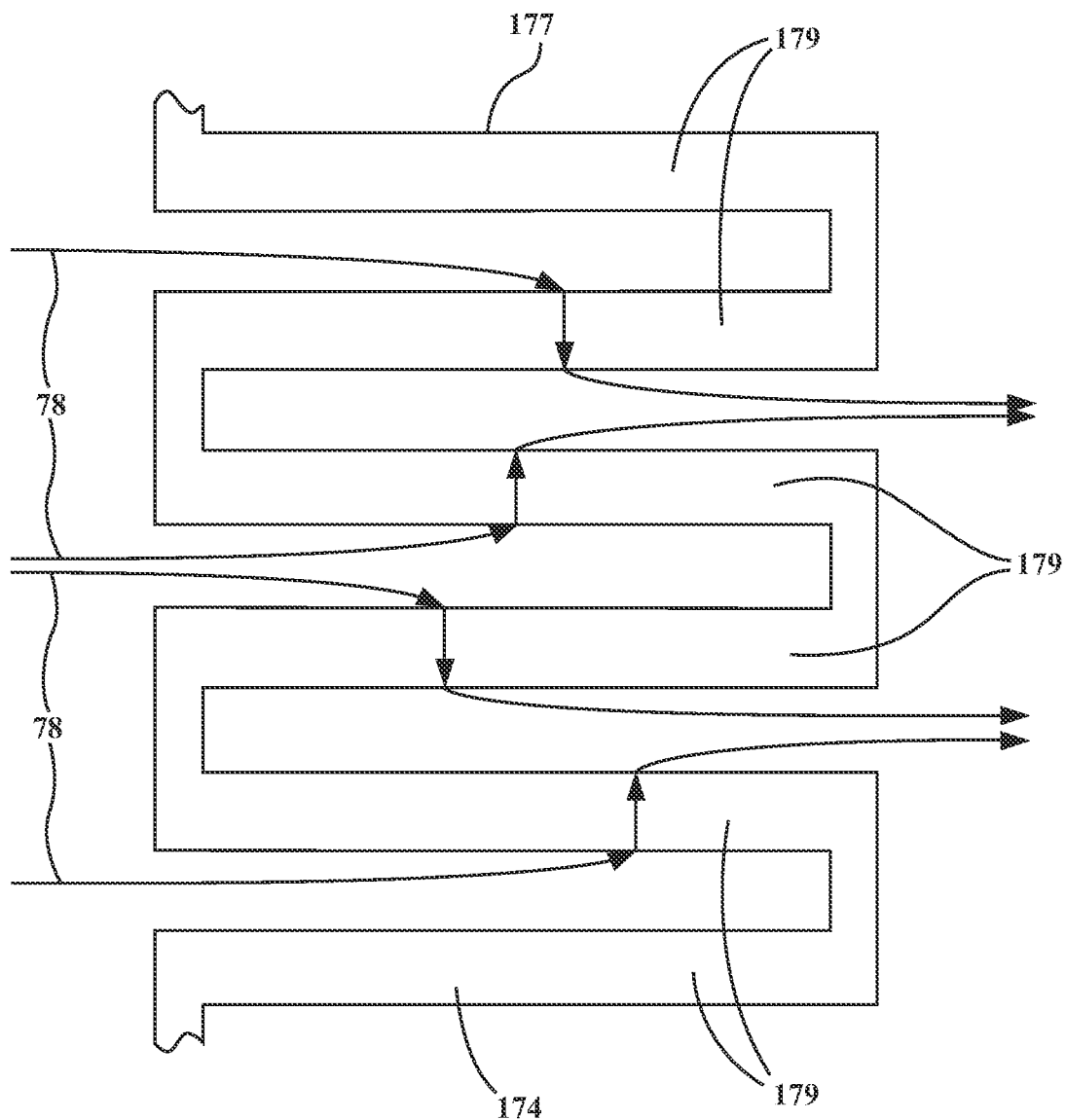
FIG. 4 schematically illustrates a wall flow filter, in accordance with the present disclosure.

FIG. 4 schematically illustrates an exemplary wall flow filter 177. The first layer 174 is illustrated including the wall flow filter 177. The wall flow filter includes a plurality of parallel filtration walls 179 which are aligned to a direction of flow of gas flow 78 through the outgassing filter 70. By providing the parallel filtration walls 179 in a pattern that winds back and forth, a surface area of the wall flow filter 177 is increased as compared to a planar filter element. The increased surface area enables the filter to contain more particulate matter than would a similarly sized planar filter element. The gas flow 78 is illustrated flowing between the parallel filtration walls 179, passing through the parallel filtration walls 179, and flowing out of the parallel filtration walls 179. The material of parallel filtration walls may include a filtration material used in the art useful for containing heated particulate matter and soot.

Figure 5:
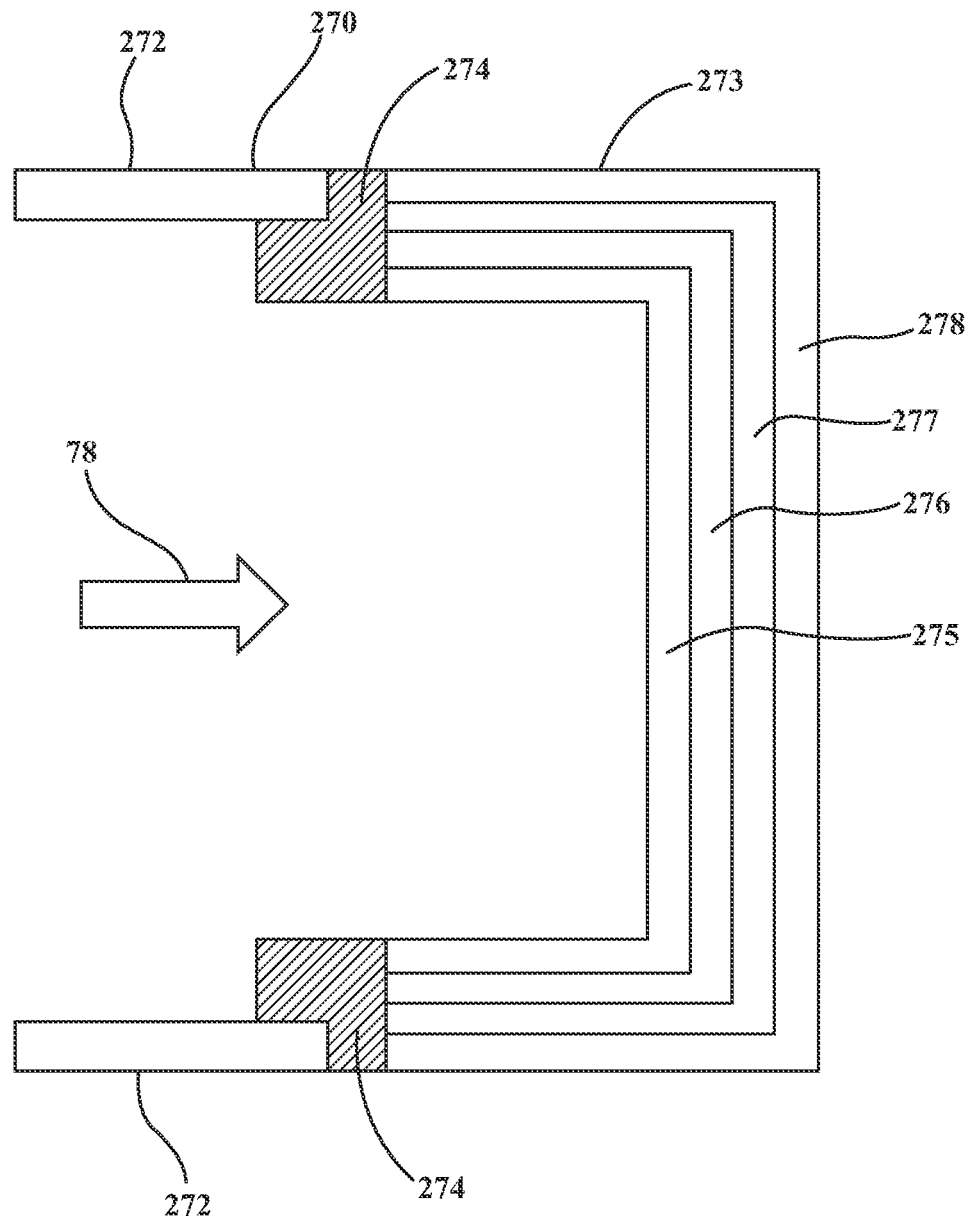
FIG. 5 schematically illustrates an exemplary battery filter device including a multi-layer, graduating filtration mesh rating, three-dimensional-polygon-shaped filtration element, in accordance with the present disclosure.

FIG. 5 schematically illustrates an exemplary alternative outgassing filter 270 including a multi-layer three-dimensional-polygon-shaped filtration element 273. The outgassing filter 270 is illustrated including an outgassing filter outer wall 272, a filter element grommet 274, and the multi-layer three-dimensional-polygon-shaped filtration element 273. The gas flow 78 is illustrated. The multi-layer three-dimensional-polygon-shaped filtration element 273 includes a first layer 275, a second layer 276, a third layer 277, and a fourth layer 278 connected to the filter element grommet 274. The first layer 275, the second layer 276, the third layer 277, and the fourth layer 278 include graduating filtration mesh ratings, with the first layer 275 having a most course mesh rating and with the fourth layer 278 having a most fine mesh rating. The multi-layer three-dimensional-polygon-shaped filtration element 273 extends outwardly away from the outgassing filter outer wall. In one embodiment, the multi-layer three-dimensional-polygon-shaped filtration element 273 may be shaped as a cylinder. In another embodiment, multi-layer three-dimensional-polygon-shaped filtration element 273 may be shaped as a cube. In another embodiment, multi-layer three-dimensional-polygon-shaped filtration element 273 may be shaped as a hemisphere.

Figure 6:
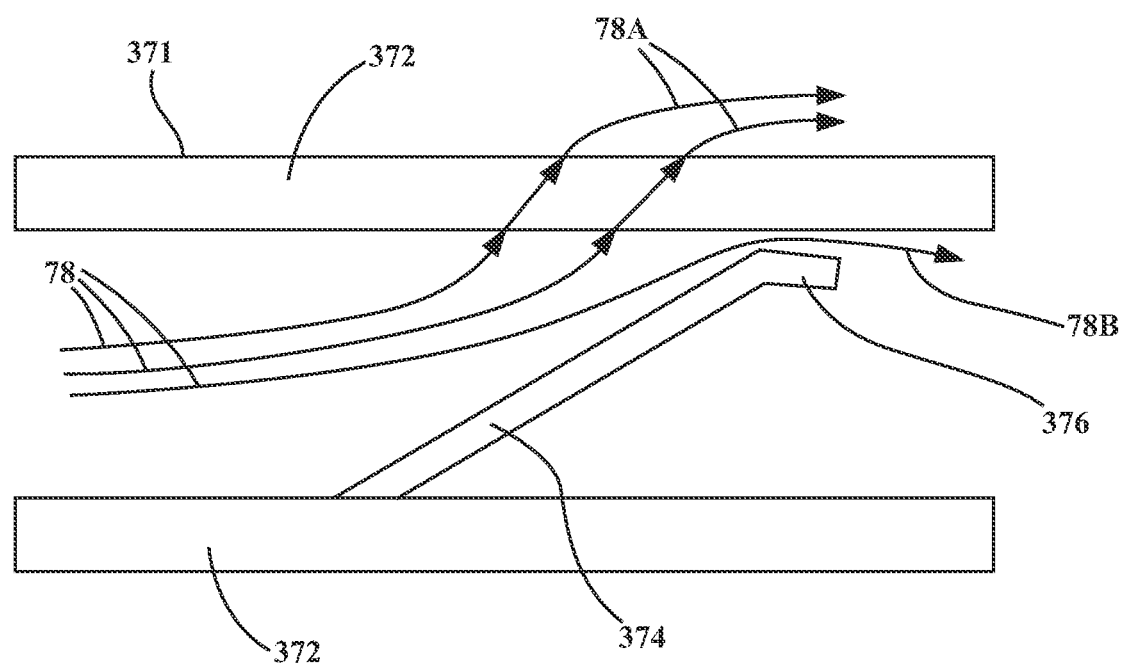
FIG. 6 schematically illustrates an exemplary battery filter device including a partial-filtration bypass gap filtration element, in accordance with the present disclosure.

FIG. 6 schematically illustrates an exemplary partial-filtration bypass gap filtration element 371 useful as an additional or alternative filtration element for the outgassing filter 70. The partial-filtration bypass gap filtration element 371 includes filtration walls 372 and a spring diverter element 374. In one embodiment, the spring diverter element 374 is configured to flex depending upon pressure exerted by the gas flow 78.

In another embodiment, a rigid diverter element with a fixed gap between the rigid diverter element and the upper filtration wall 372 may be utilized. In one embodiment, the fixed gap may be selected to be small enough to cause flow resistance through the gap, thereby forcing the gas flow 78 through the upper filtration wall 372 until the upper filtration wall becomes clogged.

The spring diverter element 374 of FIG. 6, with relatively low pressure exerted by the gas flow 78, may be operable to rest a spring diverter end portion 376 near or against the upper filtration wall 372. With the spring diverter end portion 376 resting near or against the upper filtration wall 372, most of the gas flow 78 flows through the upper filtration wall 372 as gas flow portion 78A. As particulate matter blocks or clogs some of the upper filtration wall 372, pressure exerted by the gas flow 78 against the spring diverter element 374 may rise, such that the spring diverter end portion 376 may flex away from the upper filtration wall 372 and permit some of the gas flow 78 to flow past the spring diverter element 374 as gas flow portion 78B without flowing through the upper filtration wall 372.

Figure 7:
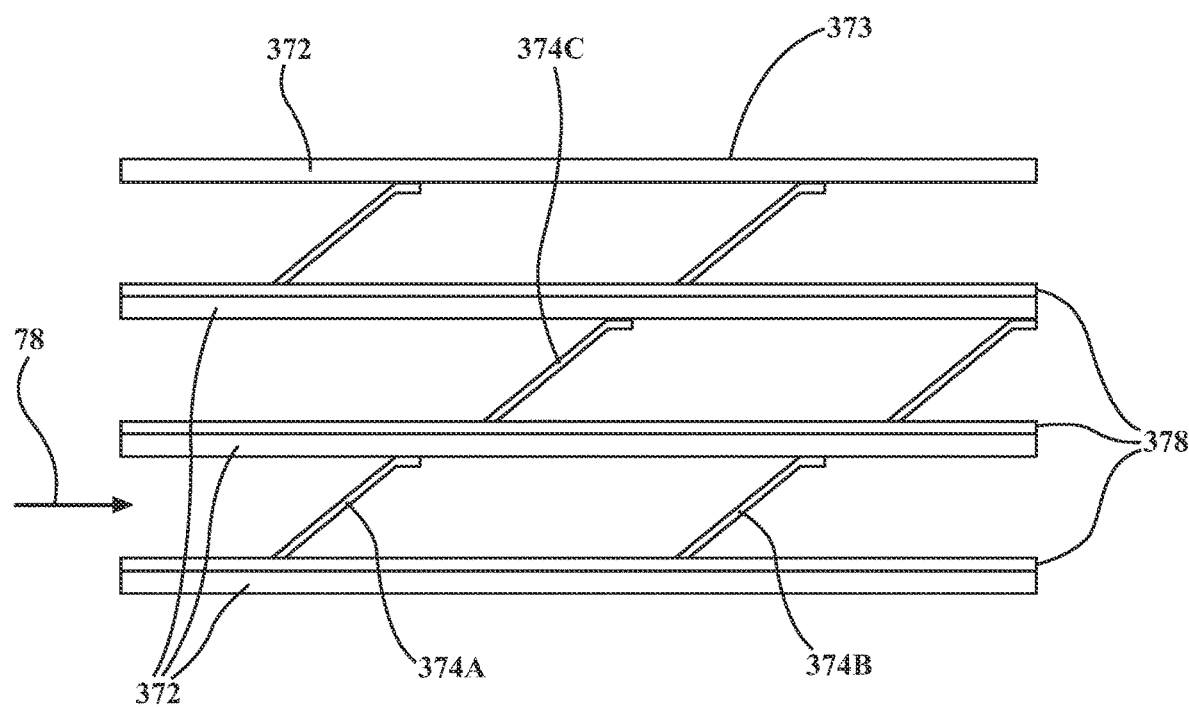
FIG. 7 schematically illustrates an exemplary battery filter device including a repeating partial-filtration bypass gap filtration element, in accordance with the present disclosure.

FIG. 7 schematically illustrates an exemplary repeating partial-filtration bypass gap filtration element 373. The repeating partial-filtration bypass gap filtration element 373 is a variation of the embodiment of FIG. 6 and includes a plurality of filtration walls 372. A plurality of carrier plates 378 are illustrated, with a spring diverter element 374A, a spring diverter element 374B, and a spring diverter element 374C being formed unitarily with and bent upward from the carrier plates 378. The spring diverter element 374B is illustrated arranged in series with the spring diverter element 374A or operable to receive a gas flow bypassing the spring diverter element 374A. The spring diverter element 374C is illustrated in parallel with the spring diverter element 374A or operable to receive a gas flow being channeled through the filtration wall 372 by the spring diverter element 374A. The carrier plates 378 are perforated and permit gas flow through the neighboring filtration walls 372. The gas flow 78 is illustrated flowing into an area between a bottom two of the filtration walls 372. As gas flow 78 approaches the spring diverter element 374A, some portion of the gas flow 78 is diverted through the filtration wall 372 illustrated above the spring diverter element 374A. As particulate matter clogs the filtration wall 372 illustrated above the spring diverter element 374A, some portion of the gas flow 78 may bypass the spring diverter element 374A and proceed to the spring diverter element 374B. This process repeats with the spring diverter element 374B and the spring diverter element 374C, with the filtration walls 372 containing particulate matter and with the spring diverter element 374B and the spring diverter element 374C each enabling some portion of the gas flow 78 to bypass the spring diverter elements as the filtration walls 372 become clogged. The repeating partial-filtration bypass gap filtration element 373 may be utilized as an element in the outgassing filter, for example, as the second layer 175 in FIG. 3. By utilizing a matrix of spring diverter elements, the repeating partial-filtration bypass gap filtration element 373 enables the outgassing filter 70 to provide for increased filtration capacity in a filtration element.

Figure 8:
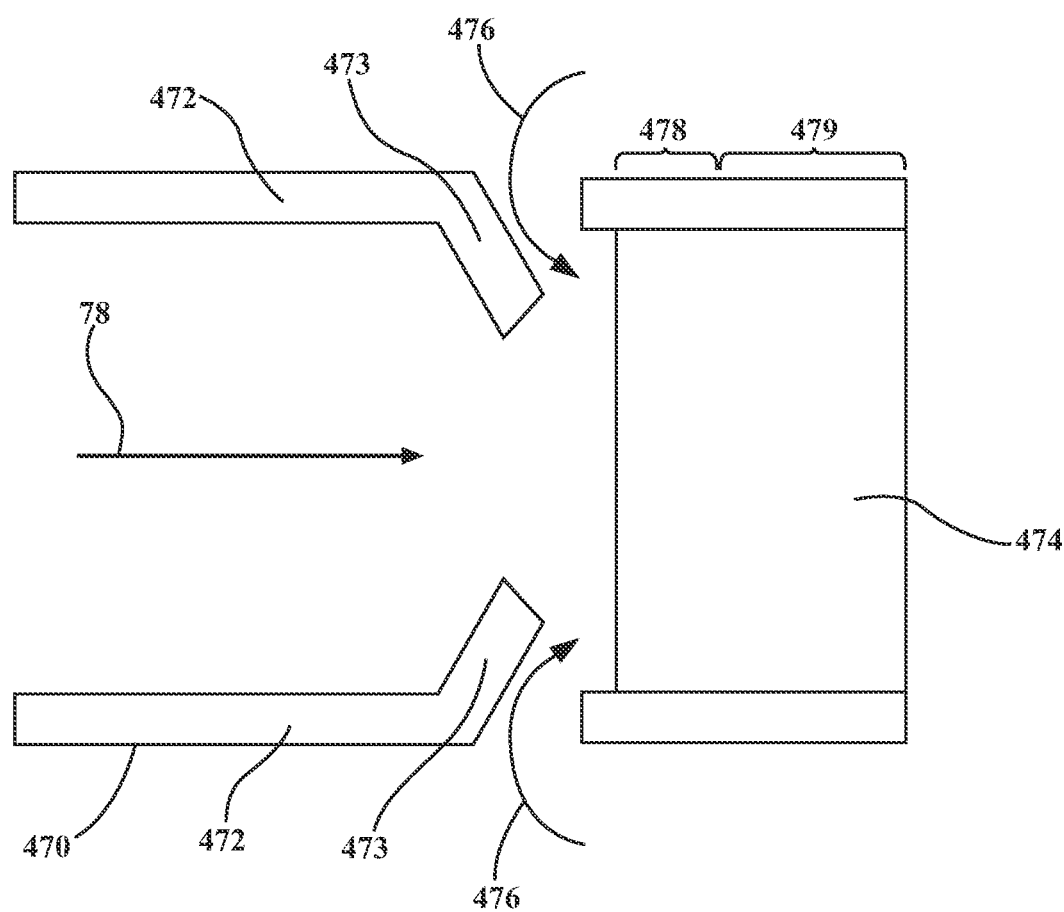
FIG. 8 schematically illustrates an exemplary battery filter device including a catalyzed filter element, in accordance with the present disclosure.

FIG. 8 schematically illustrates an exemplary alternative outgassing filter 470 including a catalyzed filter element 474. The outgassing filter 470 includes an outgassing filter outer wall 472 and the catalyzed filter element 474. The gas flow 78 is illustrated. The catalyzed filter element 474 includes a catalyzing material that is used to create a chemical reaction upon the catalyzed filter element 474. The chemical reaction upon the catalyzed filter element 474 may utilize a particular oxygen content to break down particulate matter that reaches the catalyzed filter element 474. The outgassing filter outer wall 472 includes internal walls 473 and openings to an outside of the outgassing filter outer wall 472 operable to create a venturi effect where air flows 476 are drawn into the outgassing filter 470. By selecting geometry of the outgassing filter outer wall 472 and the internal walls 473, a desired oxygen content within the outgassing filter 470 may be achieved to accomplish the desired chemical reaction upon the catalyzed filter element 474 while preventing presence of oxygen within the outgassing filter 470 at a level that would permit ignition of the reactive gases within the gas flow 78. Equation 1 provides an exemplary description of a reaction rate for a catalyzed filter element.

$$\dot{R} \sim [C][O_2]e^{\frac{-A_e}{RT}} \quad [1]$$

$\dot{R}$ describes the reaction rate. The reaction rate is proportional to the concentration of the reaction species, carbon (C) and oxygen ($O_2$). $A_e$ is the activation energy, T is the absolute temperature, and R is the universal gas constant.

The catalyzed filter element 474 may include a first portion 478 with geometry operable to contain and chemically react with a first size of particulate matter. The catalyzed filter element 474 may include a second portion 479 with geometry operable to contain and/or chemically react with a second size of particulate matter relatively smaller than the first size of particulate matter. In another embodiment, an additional layer of a filtration element may be utilized in the outgassing filter 470, such that the catalyzed filter element 474 may be operable to contain one of a first size of particulate matter and a second size of particulate matter relatively smaller than the first size of particulate matter, and the additional layer of the filtration element may be operable to contain a second of the a first size of particulate matter and the a second size of particulate matter relatively smaller than the first size of particulate matter.

Figure 9:
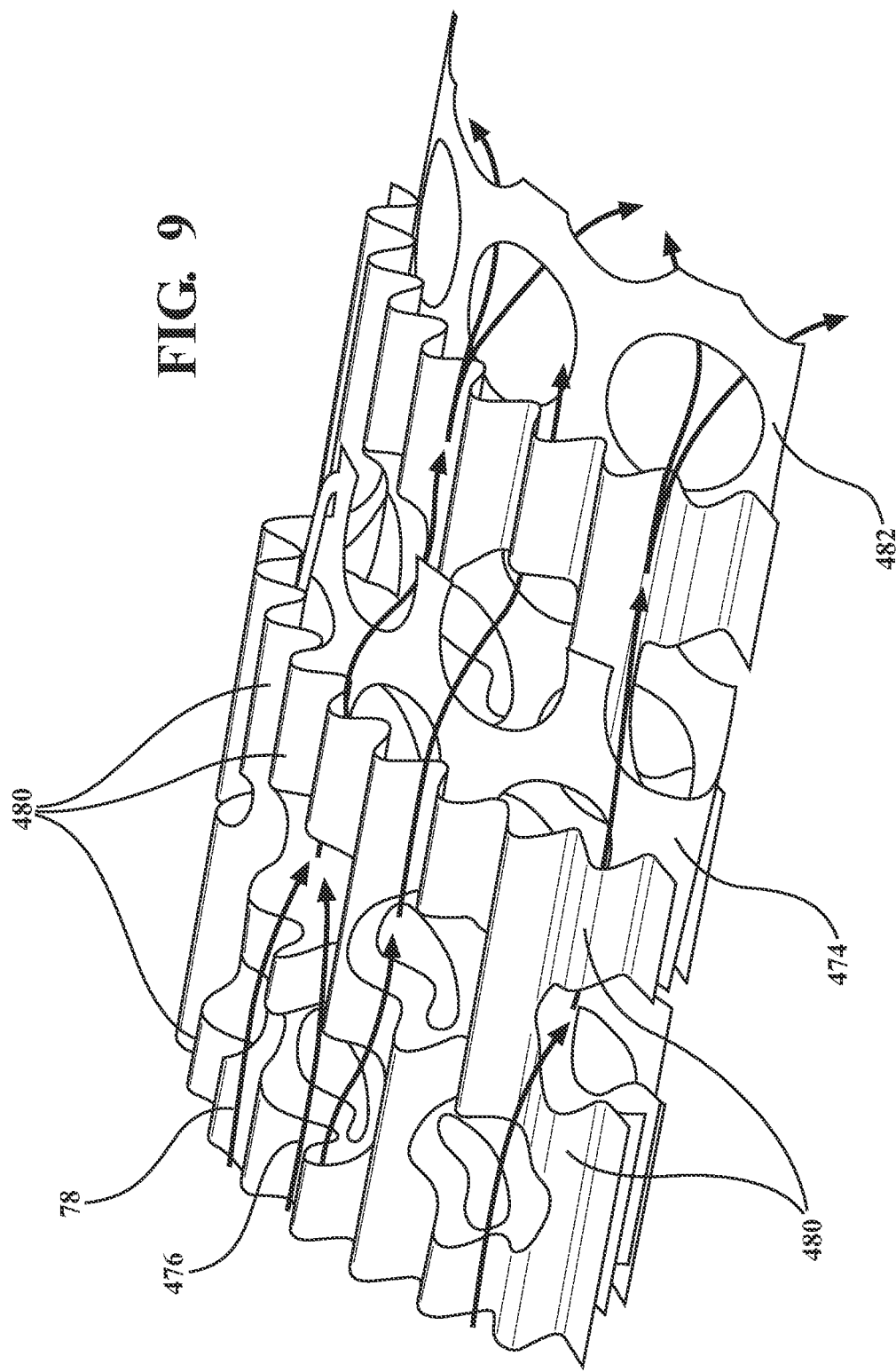
FIG. 9 schematically illustrates the catalyzed filter element of FIG. 8, in accordance with the present disclosure.

FIG. 9 schematically illustrates the catalyzed filter element 474. The catalyzed filter element 474 is illustrated including bent fins 480 including catalyzing material and a carrier plate 482. The gas flow 78 and the air flow 476 are illustrated being channeled by the bent fins 480 to encourage mixing of the gas flow 78 and the air flow 476.

Figure 10:
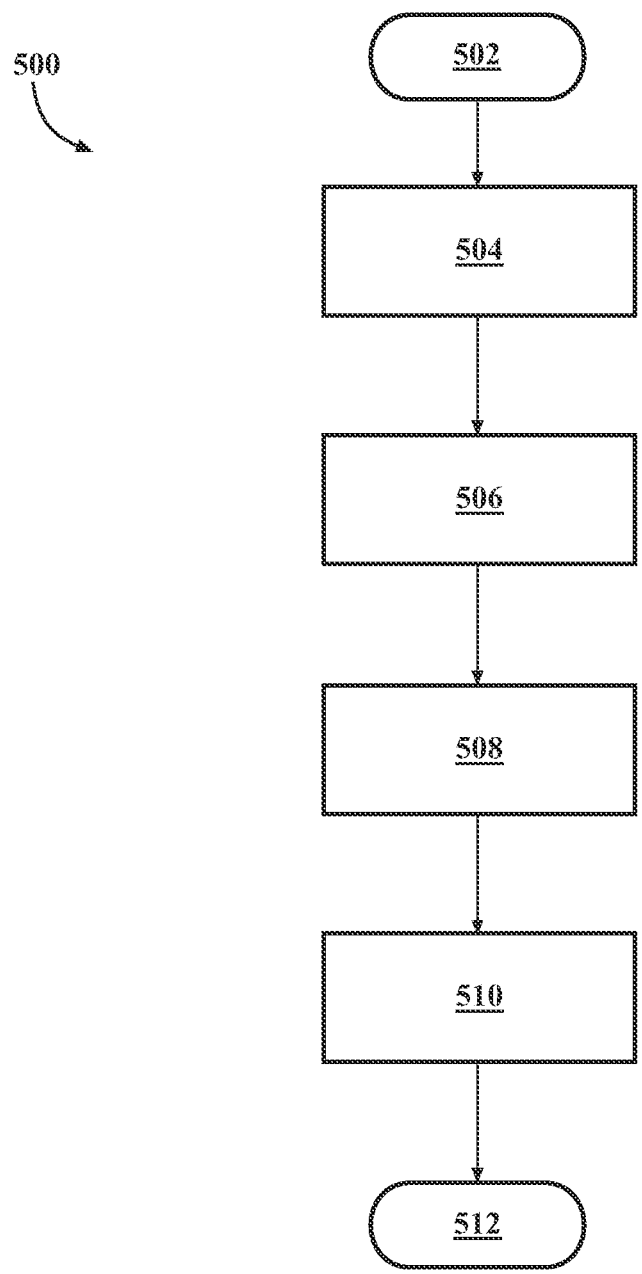
FIG. 10 is a flowchart illustrating a method to filter outgassing from a battery, in accordance with the present disclosure.

FIG. 10 is a flowchart illustrating a method to filter outgassing from a battery. The method starts at step 502. At step 504, a battery cell is contained within a sealed external casing, such that gas generated by the battery cell may exit the external casing through a casing vent. At step 506, an outgassing filter is disposed to the casing vent, such that gas generated by the battery cell and flowing through the casing vent passes through the outgassing filter. The outgassing filter includes a filter element including a first filter element portion operable to contain a first size of particulate matter and a second filter element portion operable to contain a second size of particulate matter relatively smaller than the first size of particulate matter. At step 508, a gas flow generated by an outgassing event is channeled through the outgassing filter. At step 510, the gas flow is permitted to flow through the outgassing filter for some threshold period of time while particulate matter is contained within the outgassing filter. At step 512, the method 500 ends. A number of additional or alternative method steps are envisioned, and the disclosure is not intended to be limited to the exemplary method steps provided herein.

While the best modes for carrying out the disclosure have been described in detail, those familiar with the art to which this disclosure relates will recognize various alternative designs and embodiments for practicing the disclosure within the scope of the appended claims.

What is claimed is:

1. A battery outgassing filter system, comprising:
a battery cell;
an external casing encapsulating the battery cell and including a casing vent; and
an outgassing filter disposed upon the casing vent and including a filter element including a first filter element portion operable to contain a first size of particulate matter and a second filter element portion operable to contain a second size of particulate matter relatively smaller than the first size of particulate matter; and
wherein the first filter element portion includes a wall flow filter element including a plurality of parallel filtration walls which is aligned to be parallel to a direction of a flow of gas through the battery outgassing filter system;
wherein the plurality of parallel filtration walls includes:
a first filtration wall including a first primary face; and
a second filtration wall adjacent to the first filtration wall and including a second primary face;
wherein the first primary face is parallel to the second primary face, and
wherein the flow of gas passes the first primary face and the second primary face in a direction perpendicular to the first primary face and the second primary face.

2. The battery outgassing filter system of claim 1, wherein the first filter element portion includes a first filter mesh;
wherein the second filter element portion includes a second filter mesh; and
wherein the second filter mesh is finer than the first filter mesh.

3. The battery outgassing filter system of claim 1, wherein the first filter element portion includes a foam-based porous filter element.

4. The battery outgassing filter system of claim 1, wherein the first filter element portion includes a catalyzed filter element.

5. The battery outgassing filter system of claim 1, wherein the outgassing filter includes a multi-layer filtration element.

6. The battery outgassing filter system of claim 1, wherein the outgassing filter includes a multi-layer three-dimensional-polygon-shaped filtration element.

7. A battery outgassing filter system, comprising:
a battery cell;
an external casing encapsulating the battery cell and including a casing vent;
an outgassing filter disposed upon the casing vent and including a filter element including:
a first filter element portion including a first filter mesh operable to contain a first size of particulate matter, wherein the first filter element portion includes a wall flow filter element including a plurality of parallel filtration walls which is aligned to be parallel to a direction of a flow of gas through the battery outgassing filter system; and
a second filter element portion receiving a gas flow from the first filter element portion and including a second filter mesh operable to contain a second size of particulate matter relatively smaller than the first size of particulate matter; and
wherein the second filter mesh is finer than the first filter mesh;
wherein the plurality of parallel filtration walls includes:
a first filtration wall including a first primary face; and
a second filtration wall adjacent to the first filtration wall and including a second primary face;
wherein the first primary face is parallel to the second primary face, and
wherein the flow of gas passes the first primary face and the second primary face in a direction perpendicular to the first primary face and the second primary face.

8. The battery outgassing filter system of claim 7, wherein the first filter element portion includes a foam-based porous filter element.

9. The battery outgassing filter system of claim 7, wherein the first filter element portion includes a catalyzed filter element.

10. The battery outgassing filter system of claim 7, wherein the outgassing filter includes a multi-layer filtration element.

11. The battery outgassing filter system of claim 7, wherein the outgassing filter includes a multi-layer three-dimensional-polygon-shaped filtration element.

12. A method to filter outgassing from a battery cell, comprising:
- containing the battery cell within an external casing, wherein gas generated by the battery cell may exit the external casing through a casing vent;
- disposing an outgassing filter to the casing vent, wherein the gas generated by the battery cell and flowing through the casing vent passes through the outgassing filter, wherein the outgassing filter includes a first filter element portion operable to contain a first size of particulate matter and a second filter element portion operable to contain a second size of particulate matter relatively smaller than the first size of particulate matter; and
- wherein the first filter element portion includes a wall flow filter element including a plurality of parallel filtration walls which is aligned to be parallel to a direction of a flow of gas through the battery outgassing filter system;
- wherein the plurality of parallel filtration walls includes:
  - a first filtration wall including a first primary face; and
  - a second filtration wall adjacent to the first filtration wall and including a second primary face;
- wherein the first primary face is parallel to the second primary face, and
- wherein the flow of gas passes the first primary face and the second primary face in a direction perpendicular to the first primary face and the second primary face.

13. The method of claim 12, further comprising permitting the gas generated by the battery cell to flow through the outgassing filter for some threshold period of time while particulate matter is contained within the outgassing filter.

* * * * *